(12) United States Patent  (10) Patent No.: US 7,179,315 B2
Huang  (45) Date of Patent: Feb. 20, 2007

(54) VERTICAL-SHAFT AIR FILTERING DEVICE HAVING HIGH FLOW RATE AND TWO-WAY AIR INTAKE STRUCTURE

(76) Inventor: Jui-Fa Huang, No. 523, Jhanglu Rd., Sioushuei Township, Changhua County 504 (TW)

( * ) Notice: Subject to any disclaimer, the term of this patent is extended or adjusted under 35 U.S.C. 154(b) by 372 days.

(21) Appl. No.: 10/910,282

(22) Filed: Aug. 4, 2004

(65) Prior Publication Data
US 2006/0026935 A1    Feb. 9, 2006

(51) Int. Cl.
*B01D 45/12* (2006.01)
*B01D 50/00* (2006.01)

(52) U.S. Cl. .................... 55/337; 55/385.3; 55/482; 55/505; 96/421

(58) Field of Classification Search .................. 55/337, 55/385.3, 482, 505; 96/421
See application file for complete search history.

(56) References Cited

U.S. PATENT DOCUMENTS 6,833,023 B1 * 12/2004 Vandenberghe et al. ...... 95/268
6,955,699 B2 * 10/2005 Bergami ..................... 55/385.3

* cited by examiner

*Primary Examiner*—Robert A. Hopkins
(74) *Attorney, Agent, or Firm*—Troxell Law Office, PLLC (57) ABSTRACT

A vertical-shaft air filtering device having high flow rate and two-way air intake structure includes an air filter having its annular filtering member provided thereon with a fixed annular cover which is provided with an auxiliary air intake and a sheet-shaped filtering member in the center. Thus, air sucked in a hollow tube can pass through the annular filtering member and the sheet-shaped filtering member and, after filtered, get in the engine room of a vehicle, not only having a function of air filtering, but also able to enable the engine to increase instant air intake speed and amount.

7 Claims, 11 Drawing Sheets

VERTICAL-SHAFT AIR FILTERING DEVICE HAVING HIGH FLOW RATE AND TWO-WAY AIR INTAKE STRUCTURE

BACKGROUND OF THE INVENTION

Field of the Invention

This invention relates to an air filter for the engine of a vehicle, particularly to one having two-way air intake structure, not only enabling the engine to increase air intake speed and amount, but also having a function of air filtering.

Figure 1:
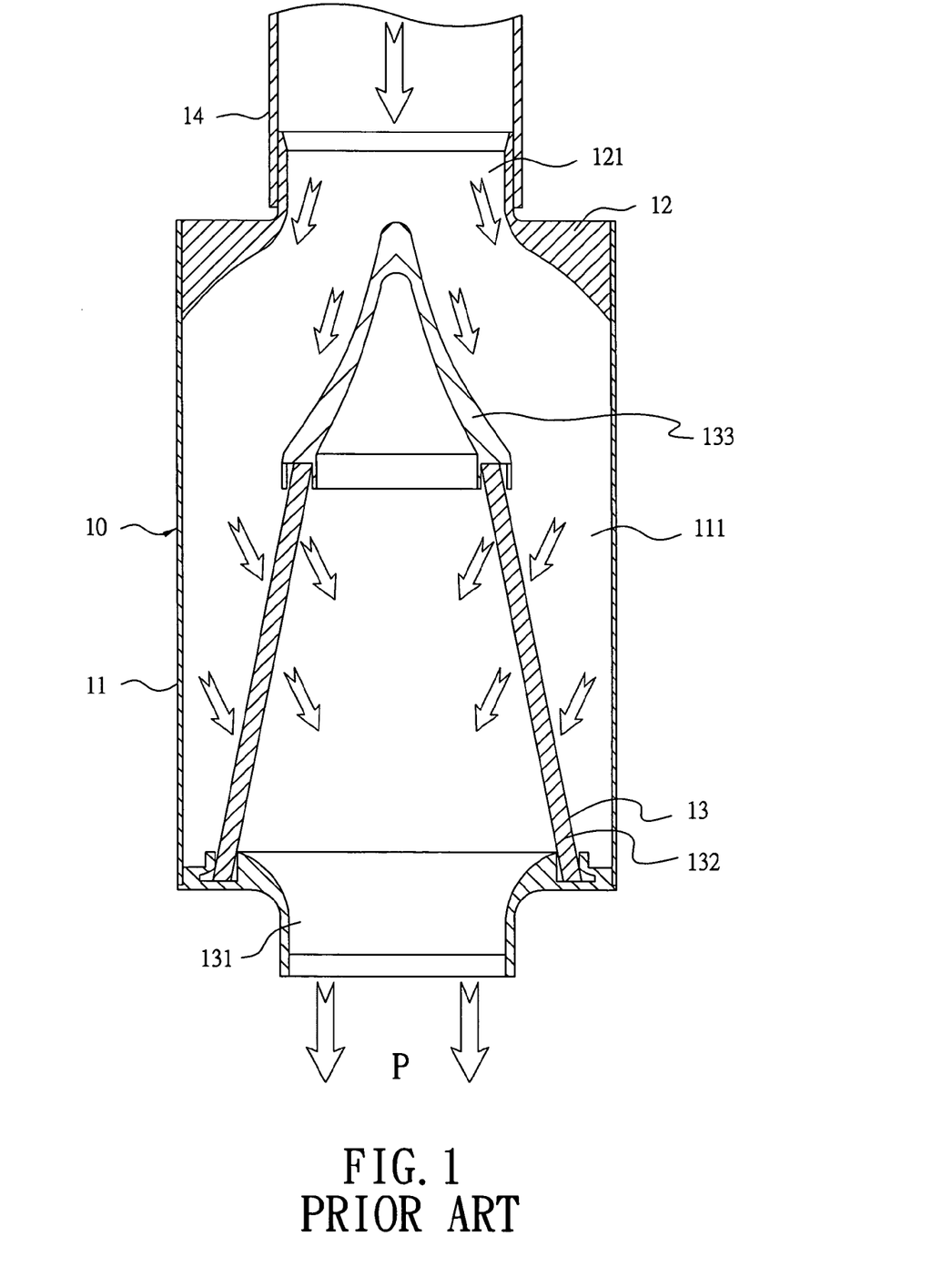
FIG. 1 is a cross-sectional view of a conventional vertical-shaft air-filtering device.

A conventional vertical-shaft air-filtering device 10 installed in the engine of a vehicle, as shown in FIG. 1, is composed of a hollow tube 11, an air intake-guiding base 12 and an air filter 13. Cold air outside a vehicle is sucked into the inner hollow compartment 111 of the hollow tube 11 through the air intake passageway 121 of the air intake-guiding base 12. At this time, the engine is operated and produces the air intake pressure P that acts on the air-intake passageway 131 of the air filter 13 to suck air in the engine after it is filtered through the filtering member 132 of the air filter 13. The filtering member 132 is provided with a current-guiding member 133 for guiding air to flow in the inner hollow compartment 111 of the hollow tube 11.

Air outside a vehicle is guided to flow into the inner hollow compartment 111 through an outer duct 14, the air intake passageway 121 and the current-guiding member 133 and then penetrates through the filtering member 132 to get in the engine through the air intake passageway 131, that is, air outside a vehicle has to penetrate through the filtering member 132 before getting in the engine. However, the filtering member 132 is commonly made of high-density wire gauge or cotton filtering material for filtering dust and impurities in the air; therefore the filtering member 132 is limited in permeability to air and likely to cause resistance to the air getting in the engine. Especially, when the engine instantly needs to rotate at a medium or high speed for producing a forceful power, the amount of air getting in the engine within unit time is usually limited by the air intake resistance of the filtering member 132, unable to increase air intake flowing rate instantly and add enough air to the engine. Thus, it is impossible to mix air with the gas in the engine in an ideal proportion, affecting the bursting power produced by combustion of the air with gas when the engine rotates at a high speed and thus lowering the effect of horsepower output.

SUMMARY OF THE INVENTION

The objective of the invention is to offer a vertical-shaft air filtering device having its annular filtering member provided at the upper end with a fixed annular cover that is provided with a through auxiliary air-intake hole and a strip-shaped filtering member in the center, not only having function of air filtering, but also forming a two-way air intake structure to enable the engine to increase instant air intake speed and amount.

BRIEF DESCRIPTION OF DRAWINGS

This invention will be better understood by referring to the accompanying drawings, wherein.

DETAILED DESCRIPTION OF THE PREFERRED EMBODIMENTS

Figure 2:
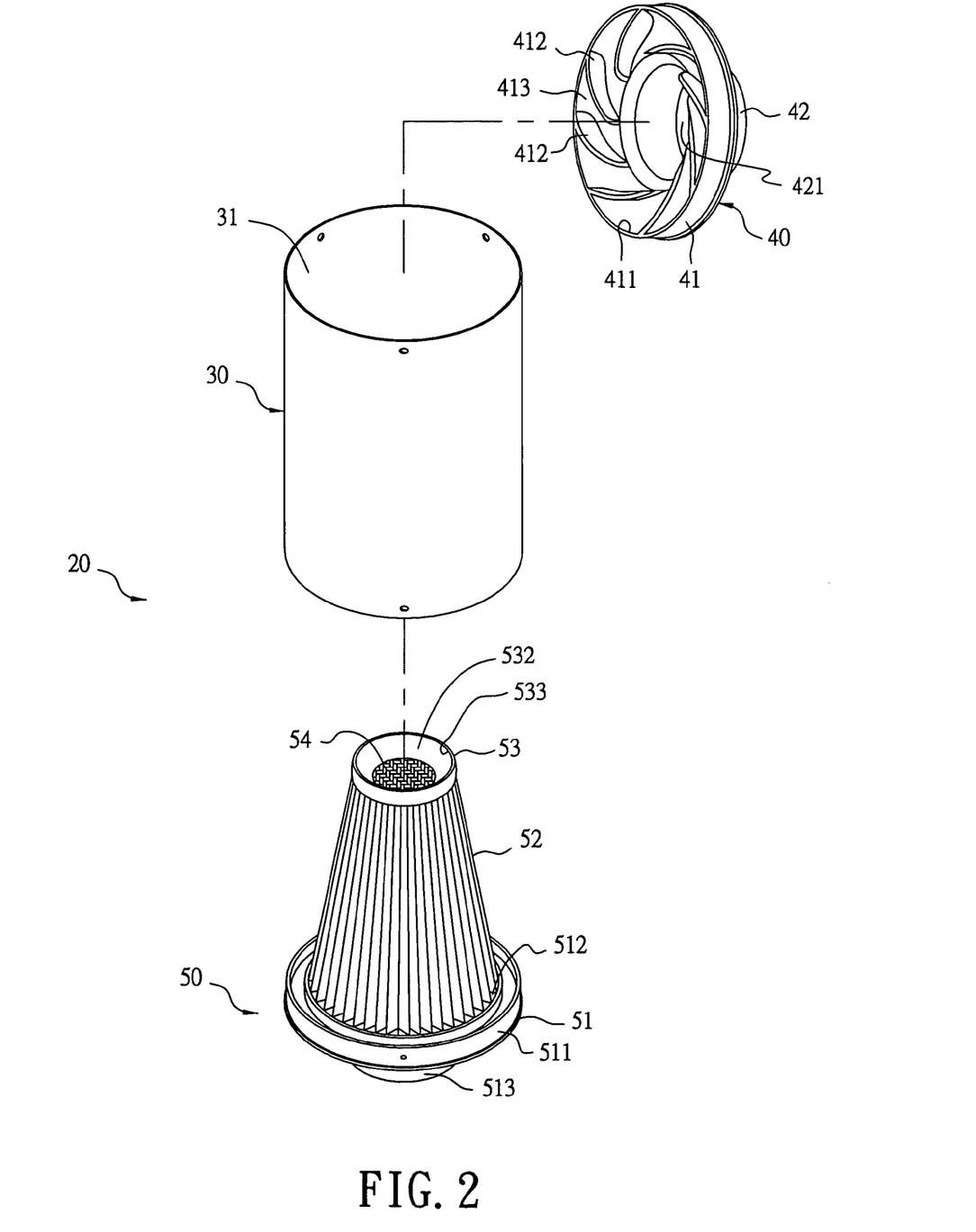
FIG. 2 is an exploded perspective view of a first preferred embodiment of a vertical-shaft air-filtering device in the present invention.
Figure 3:
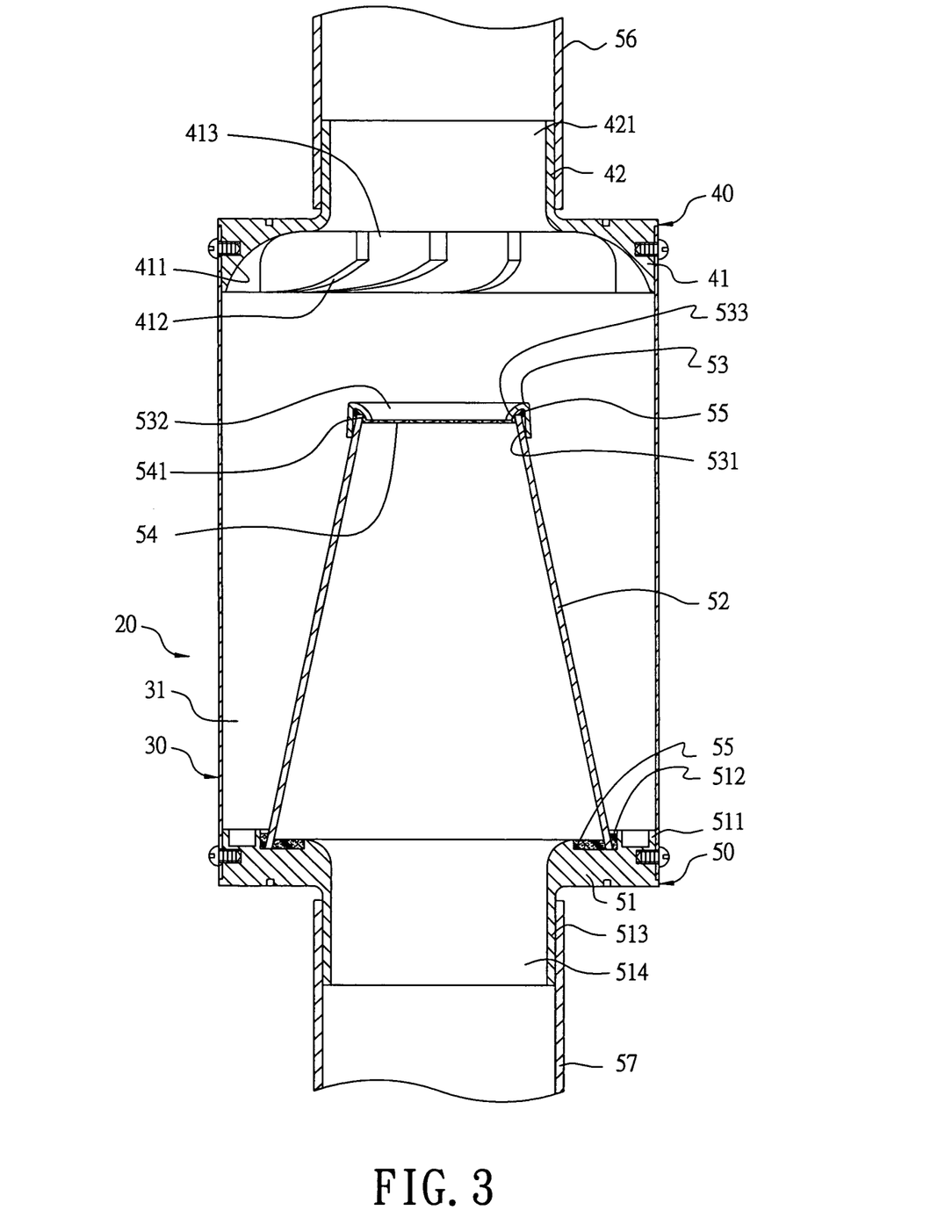
FIG. 3 is a cross-sectional view of the first preferred embodiment of the vertical-shaft air-filtering device in the present invention.

A preferred embodiment of a vertical-shaft air filtering device 20 having high flow rate and two-way air intake structure in the present invention, as shown in FIGS. 2 and 3, includes a hollow tube 30, an air intake guiding base 40 and an air filter 50 combined together.

The hollow tube 30 is a cylindrical body made of carbon fiber, having a through inner hollow compartment 31 axially formed in the interior.

The air intake guiding base 40 made of heat-resisting plastic has its lower edge formed with an annular member 41 with a comparatively large diameter to be fixed with the upper end of the inner hollow compartment 31 of the hollow tube 30. The annular member 41 has its intermediate portion extending upward and forming a tubular member 42 with a comparatively small diameter. The tubular member 42 is axially formed with an air intake 421 extending to the inner edge of the annular member 41 and forming an annular hollow 411 having an inner diameter larger than that of the air intake hole 421. The annular hollow 411 has its inner circumferential wall provided with eight current-guiding vanes 412 spaced apart equidistantly and arranged radially in the same direction, with a current-guiding passageway 413 formed between every two current-guiding vanes 412.

The air filter 50 is composed of a fundamental base 51, an annular filtering member 52, a fixed annular cover 53 and a sheet-shaped filtering member 54. The fundamental base 51 is made of heat-resisting plastic, having its lower edge formed with an annular member 511 with a comparatively large diameter to be fixed with the lower end of the inner hollow compartment 31 of the hollow tube 30. The annular member 511 has its upper circumferential edge bored with an annular groove 512 and its central portion extending downward and forming a tubular member 513 with a comparatively small diameter, with a vent hole 514 axially bored in the center of the tubular member 513. The annular filtering member 52 is shaped as a cylindrical frustum cylinder made of high-density wire gauze layers or cotton filtering material. After the annular filtering member 52 has its lower edge fitted in the annular groove 512 of the fundamental base 51, adhesives 55 is filled in the annular groove 512 to bond the annular filtering member 52 with the fundamental base 51 together. The fixed annular cover 53 has its lower edge bored with an annular groove 531 to be fixed with the upper edge of the annular filtering member 52, and its central portion formed with a through auxiliary air intake 532 corresponding to the air intake 421 of the air intake guiding base 40 and keeping away from each other at a preset distance, letting the air intake 421, the auxiliary air intake 532 and the vent hole 514 linearly communicate with one another. Furthermore, the auxiliary air intake hole 532 has its inner wall formed with a smooth arc-shaped surface 533.

The sheet-shaped filtering member 54 made of high density wire gauze has its circumferential edge formed with an annular projecting edge 541 to be positioned at the inner wall of the annular groove 531 of the fixed annular cover 53, with adhesives 55 filled in the annular groove 531 to bond the annular filtering member 52, the strip-shaped filtering member 54 and the fixed annular cover 53 all together.

Figure 4:
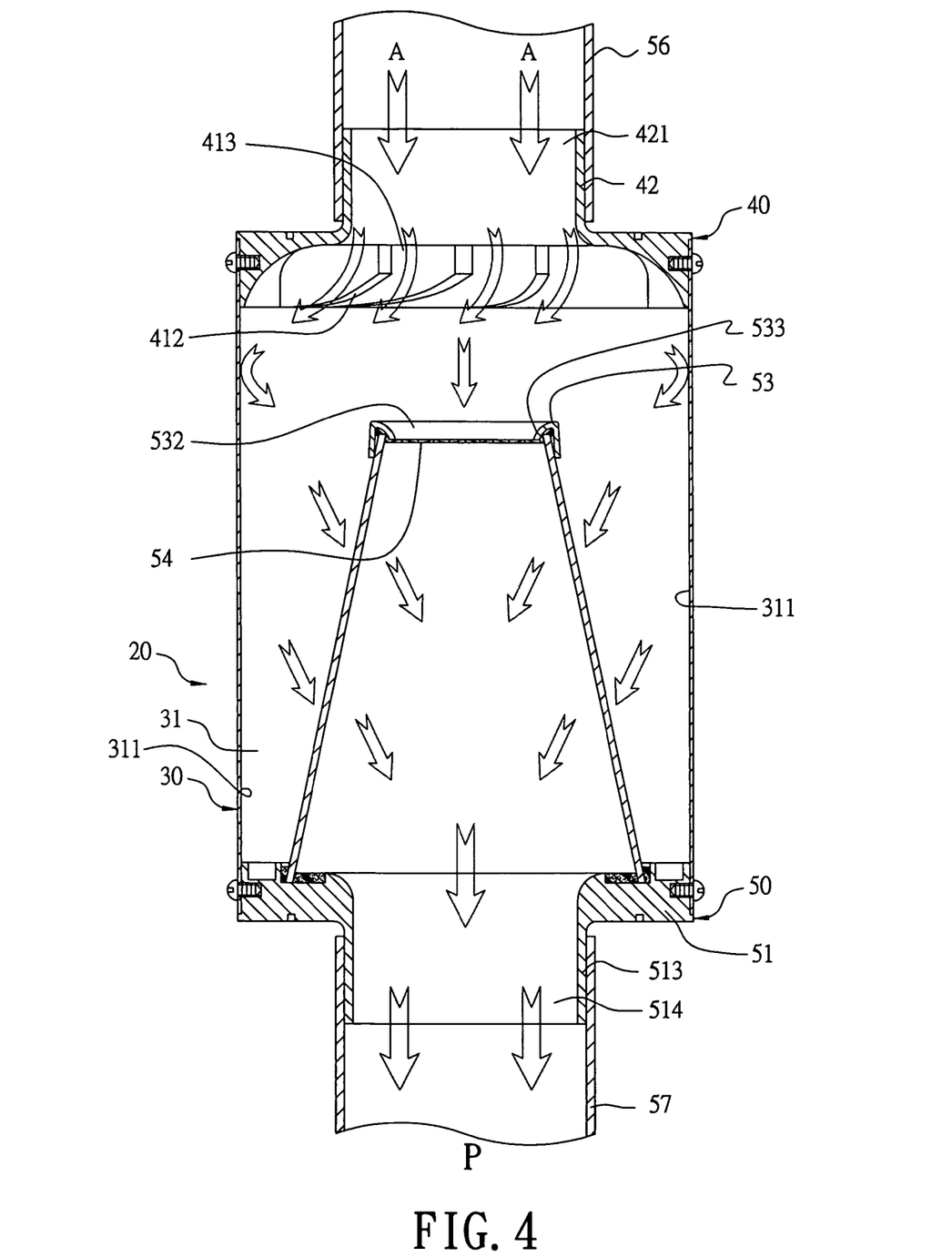
FIG. 4 is a cross-sectional view of the first preferred embodiment of the vertical-shaft air-filtering device in an air intake condition in the present invention.
Figure 5:
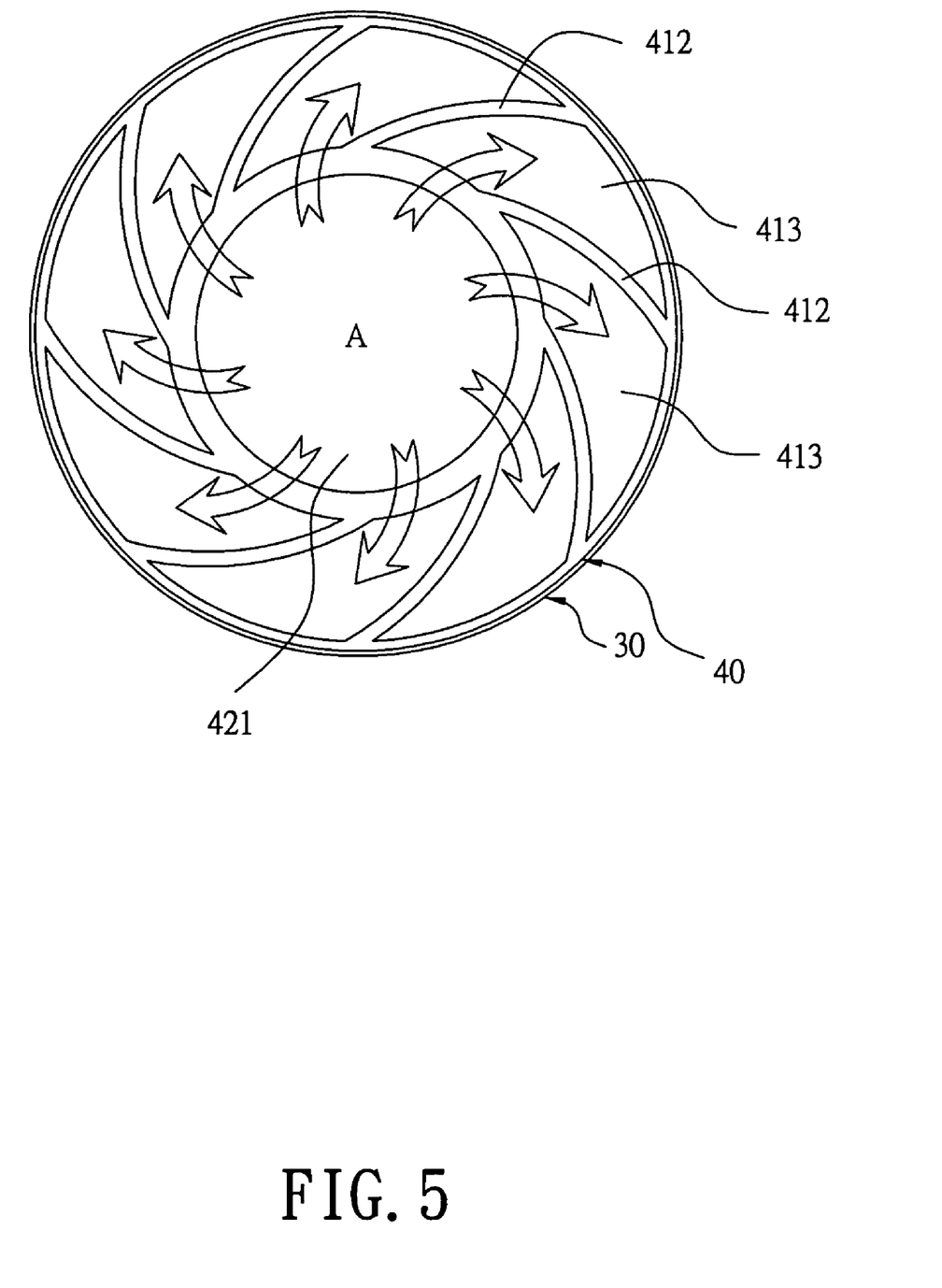
FIG. 5 is an upper view of the first preferred embodiment of the vertical-shaft air-filtering device in the present invention, showing an intake-guiding base forming an eddy intake condition.

The filtering device 20 is to be installed in the engine room of a vehicle. In assembling and using, as shown in FIGS. 4 and 5, the tubular member 42 of the air intake guiding base 40 and the tubular member 513 of the fundamental base 51 are respectively connected with an air duct 56, 57 so that air (A) outside an vehicle can be guided to get in the engine for use through the air filtering device 20. When air (A) is sucked in the air intake 421 through the air duct 56, most of the air A will be guided by the current-guiding passageways 413 and formed into eddy to increase flowing pressure and then get in the inner hollow compartment 31 of the hollow tube 30, and after circularly bumped against the inner wall 311 of the inner hollow compartment 31, the air (A) will be reflected to penetrate through the annular filtering member 53 and get in the interior of the annular filtering member 53. Simultaneously, part of the air (A) is also guided to get in the annular filtering member 52 after it passes through the auxiliary air intake 532 of the fixed annular cover 53 and is filtered by the sheet-shaped filtering member 54. Afterward, the air (A) is gathered together and moves in the engine room through the vent hole 514 under the fundamental base 51.

When an engine instantly needs to rotate at a medium or high speed for producing a great power, air intake pressure P inside the engine has to increase in an instant. At this time, since the vent hole 514, the interior of the annular filtering member 52, the sheet-shaped filtering member 54, the auxiliary air intake hole 532 and the air intake 421 communicate with one another linearly; therefore, when the air intake pressure P increases, instant air intake pressure will be formed in the vent hole 514 and the interior of the annular filtering member 52, and a great quantity of external air will be sucked into the hollow tube 30 through the air intake hole 421. Simultaneously, most of the air sucked in the hollow tube 30 will be forced by the instant vacuum pressure to get in the engine directly through the auxiliary air intake hole 532 to quickly supply the engine with enough air, and the rest of the air will penetrate through the annular filtering member 52 and, after filtered, get in the engine through the vent hole 514. Thus, the instant flowing speed and amount of the air getting in the engine within unit time can greatly increase, and the mixing ratio of oil gas in the engine can attain an excellent condition to elevate a bursting power produced by combustion of the air with gas when the engine rotate instantly at a medium or high speed, enabling the engine to increase air intake rate to elevate horsepower output, and having function of air filtering as well.

Figure 6:
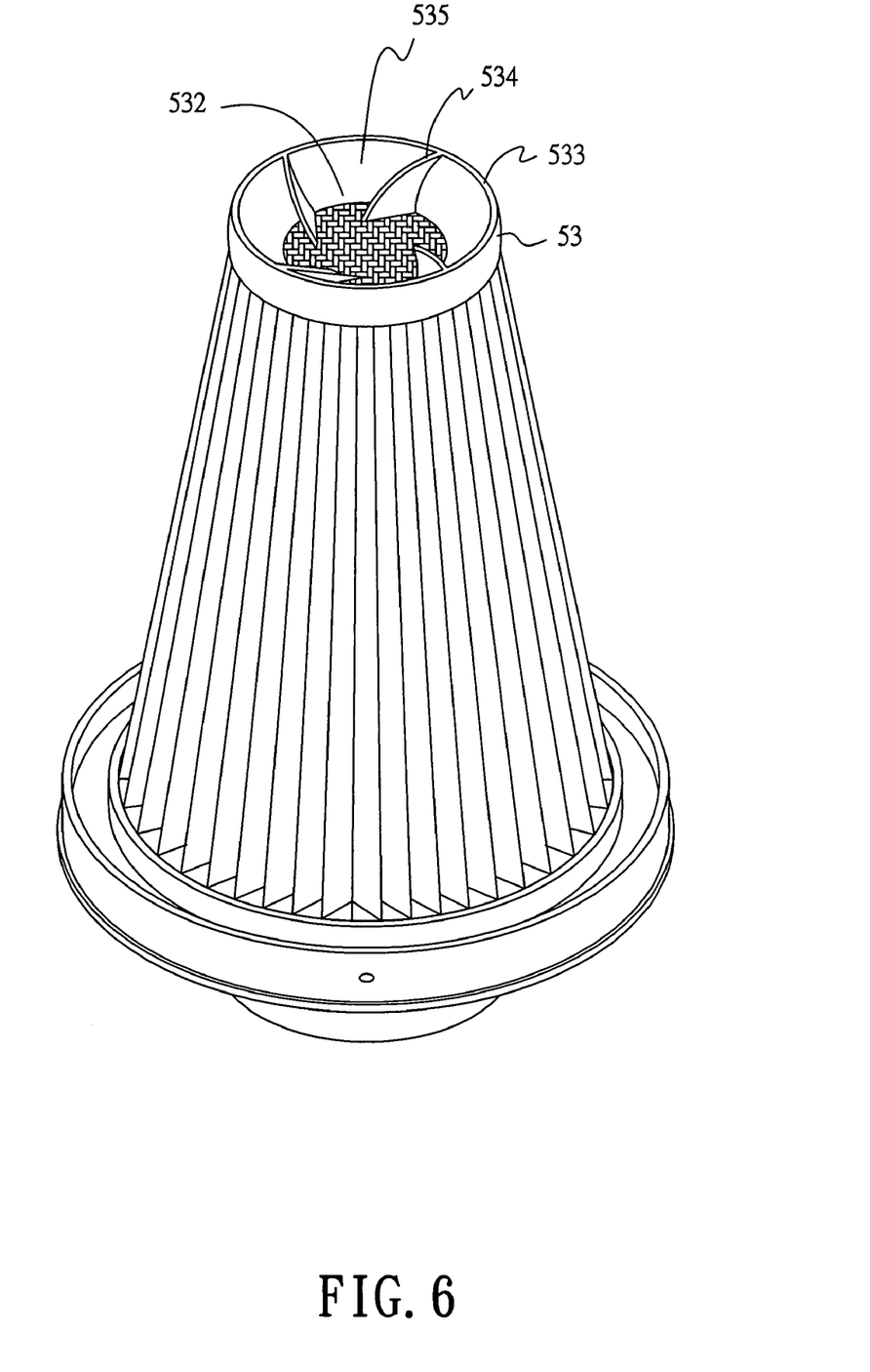
FIG. 6 is a perspective view of a second preferred embodiment of a vertical-shaft air-filtering device in the present invention.

A second preferred embodiment of a vertical-shaft air filtering device having high flow rate and two-way air intake structure in the present invention, as shown in FIG. 6, is to have the inner wall of the auxiliary air intake 532 of the fixed annular cover 53 provided with four current-guiding vanes 534 spaced apart equidistantly and arranged radially in the same direction. A current-guiding passageway 535 is formed between every current-guiding vane 534 to enable the auxiliary air intake 532 to form eddy for air flowing so as to increase the air intake speed and amount.

Figure 7:
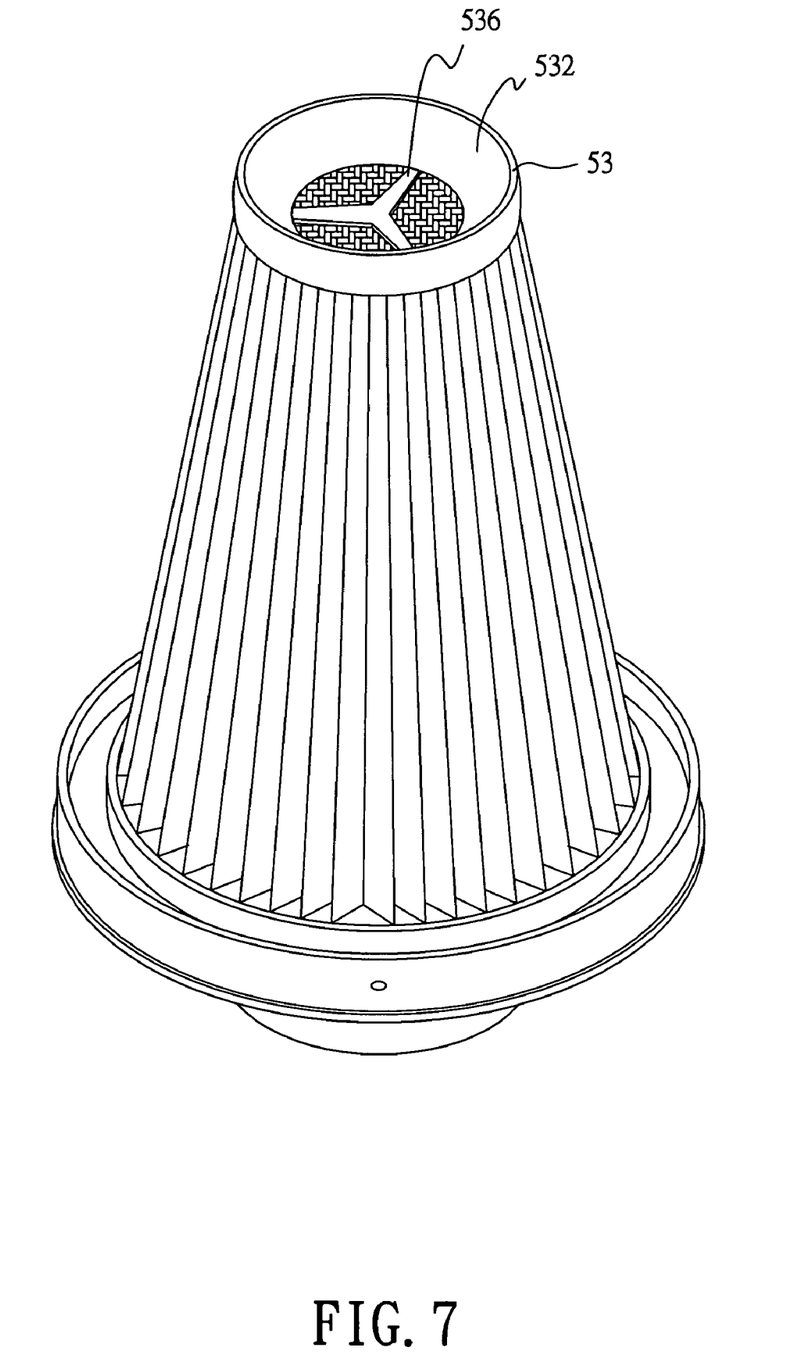
FIG. 7 is a perspective view of a third preferred embodiment of a vertical-shaft air-filtering device in the present invention.

A third preferred embodiment of a vertical-shaft air filtering device having high flow rate and two-way air intake structure in the present invention, as shown in FIG. 7, is to have the lower edge of the inner wall of the auxiliary air intake 532 of the fixed annular cover 53 provided with preset-shaped ribs 536 or engraved designs for structure reinforcement or mark display.

Figure 8:
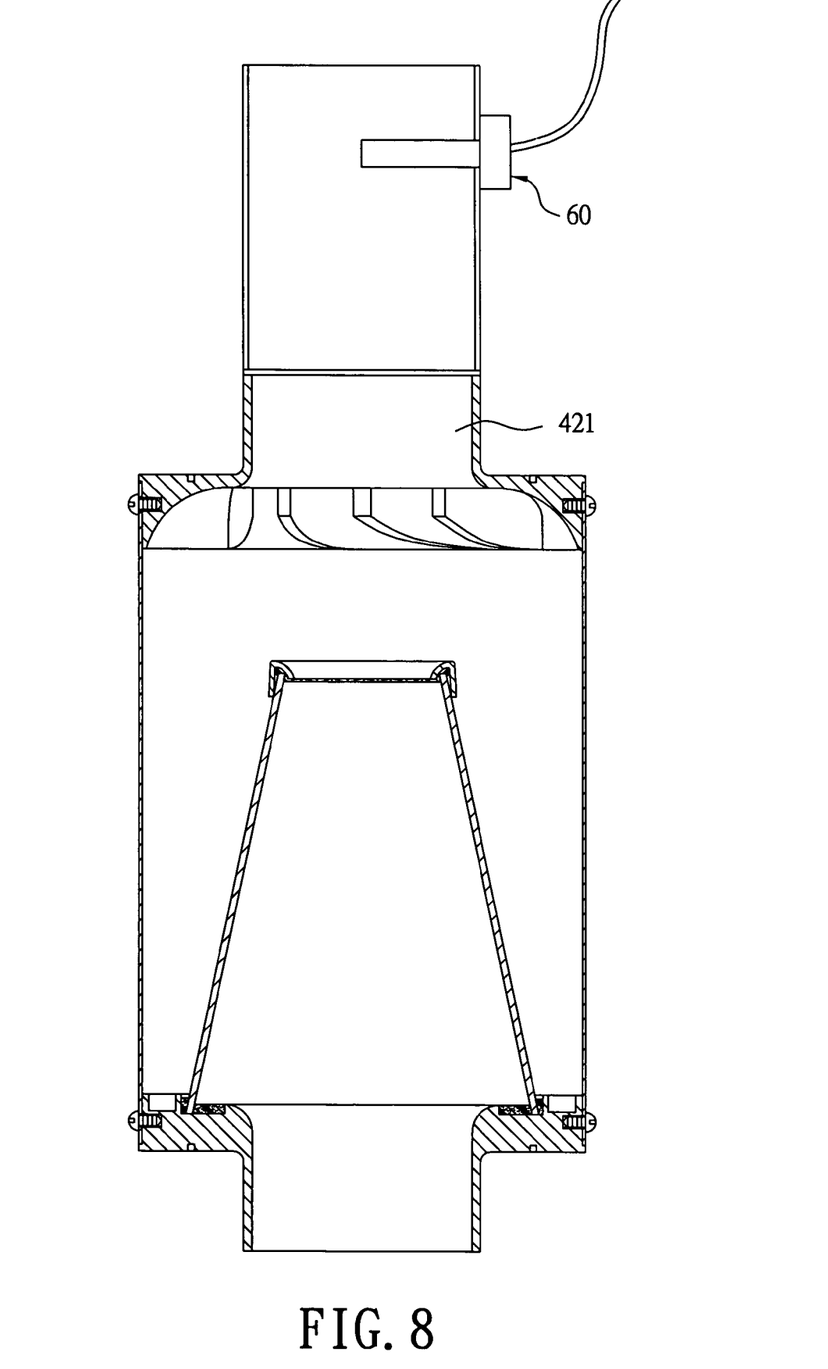
FIG. 8 is a cross-sectional view of a fourth preferred embodiment of a vertical-shaft air-filtering device in the present invention.

A fourth preferred embodiment of a vertical-shaft air filtering device having high flow rate and two-way air intake structure in the present invention, as shown in FIG. 8, is to further add a measuring device 60, such as a pressure sensor or a flow meter, assembled on the air intake 421 of the tubular member 42 or on the vent hole 514 of the fundamental base 51 for adjusting and controlling air intake amount.

Figure 9:
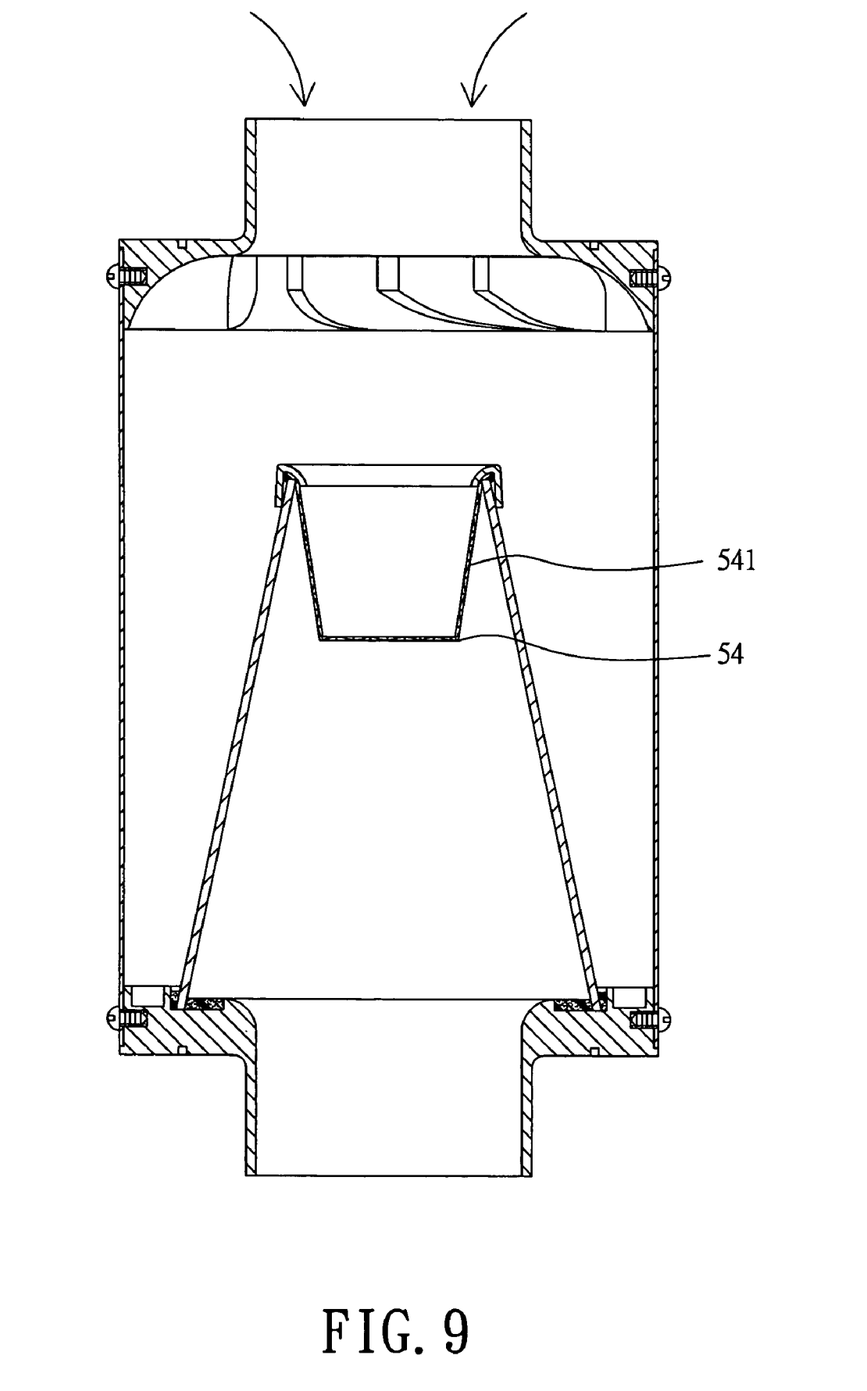
FIG. 9 is a cross-sectional view of a fifth preferred embodiment of a vertical-shaft air filtering device in the present invention, showing the edge of a strip-shaped filtering member extending downward to a certain distance.

A fifth preferred embodiment of a vertical-shaft air filtering device having high flow rate and two-way air intake structure in the present invention, as shown in FIG. 9, is to have the annular edge 541 of the strip-shaped filtering member 54 extended downward to form an inner recess extending to the interior of the annular filter core 52.

Figure 10:
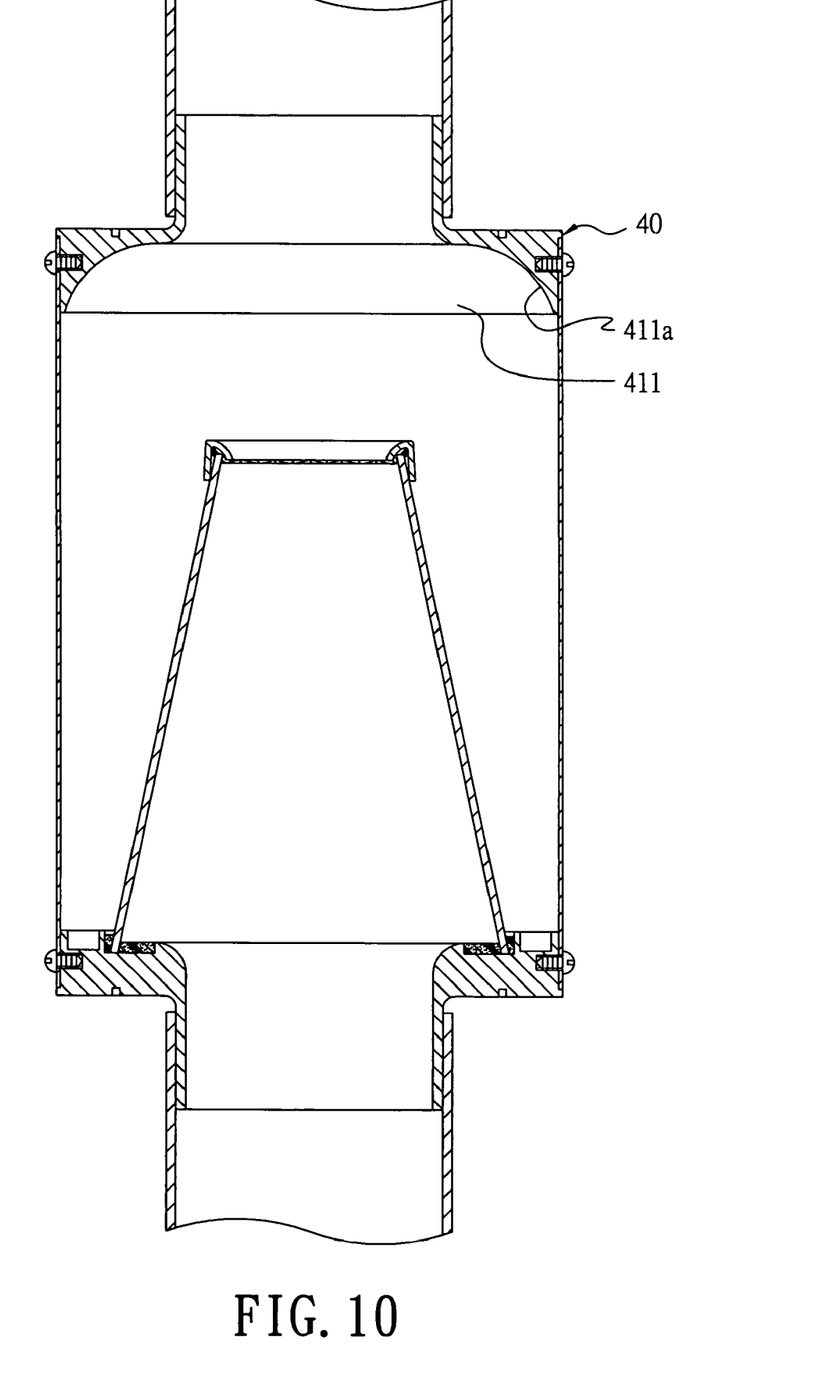
FIG. 10 is a cross-sectional view of a sixth preferred embodiment of a vertical-shaft air filtering device having the inner wall of its intake guiding base formed with an arc-shaped current-guiding surface in the present invention; and, FIG. 11 is a cross-sectional view of a seventh preferred embodiment of a vertical-shaft air-filtering device in the present invention.

A sixth preferred embodiment of a vertical-shaft air filtering device having high flow rate and two-way air intake structure in the present invention, as shown in FIG. 10, is to have the inner wall of the annular hollow 411 of the air intake guiding base 40 formed with an arc-shaped current-guiding surface 411*a* for guiding air to flow into the inner hollow compartment 31 of the hollow tube 30.

Figure 11:
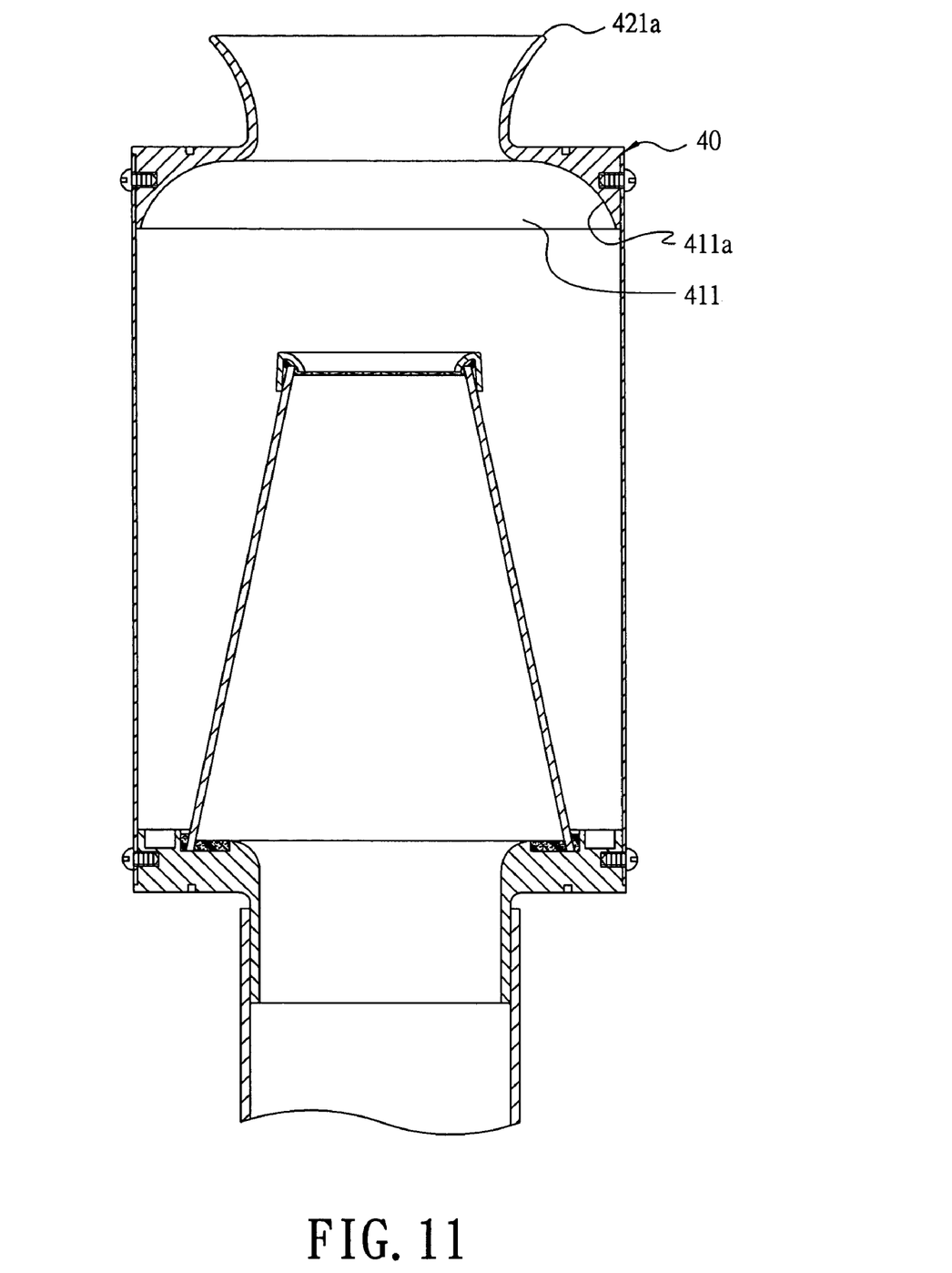

Further, FIG. 11 shows a seventh preferred embodiment of a vertical-shaft air filter device having the high flow rate and two-way air intake structure in the present invention, which has an air intake guiding base 40 provided with a intake hole 421 defined by an annular concave wall with a widened opening 421*a* so that air volume can be boosted up when the air filter device 20 gathers air.

Specifically, the vertical-shaft air-filtering device of this invention has the upper side of the annular filtering member provided with the auxiliary intake facing the air intake of the intake-guiding base. Thus, when the engine of a vehicle instantly rotates at a medium or high speed, most of the air sucked in can quickly and directly flow into the interior of the engine through the air intake of the intake-guiding base, the auxiliary intake, the sheet-shaped filtering member and the vent hole, and the rest of the air penetrates through the annular filtering member and gets in the engine through the vent hole, not only increasing the amount of air flowing in the engine instantly by eddy and two-way air intake structure, but also having function of air filtering.

While the preferred embodiments of the invention have been described above, it will be recognized and understood that various modifications may be made therein and the appended claims are intended to cover all such modifications that may fall within the scope and spirit of the invention.

I claim:

1. A vertical-shaft air-filtering device having high flow rate and two-way air intake structure comprising:

A hollow tube axially formed with a through inner hollow compartment in the interior:

An air intake guiding base connected with the upper end of said hollow tube, said air intake guiding base having axially bored with an air intake in the center: and An air filter provided with a fundamental base having an vent hole axially bored in the center, said fundamental base fixed with the lower end of said hollow tube, said fundamental base having its topside secured with an annular filtering member extending upward to a preset height, said annular filtering member positioned inside said inner hollow compartment, said annular filtering member having its upper end provided with a fixed annular cover, said fixed annular cover formed with a through auxiliary air intake hole in the center, said auxiliary air intake aligned to said air intake of said air intake guiding base, and keeping away from each other for a preset distance, said air intake of said air intake guiding base and said auxiliary air intake and said vent hole of said fundamental base linearly communicating with one another, said auxiliary air intake having a strip-shaped filtering member provided at the upper side, said sheet-shaped filtering member firmly positioned under said fixed annular cover.

2. The vertical-shaft air filtering device having high flow rate and two-way air intake structure as claimed in claim 1, wherein said air intake guiding base has its lower edge formed with an annular member with a comparatively large diameter to be fitted with the upper end of said hollow tube, said annular member having its central portion extending upward and forming a tubular member with a comparatively small diameter, said tubular member having an air intake axially formed in the center, said air intake extending to the inner wall of said annular member and forming an annular hollow with a comparatively large inner diameter, said annular hollow having its inner wall provided with plural current-guiding vanes preset in number and spaced apart equidistantly, said current-guiding vanes arranged radially in the same direction, a current-guiding passage formed between every two current-guiding vanes.

3. The vertical-shaft air filtering device having high flow rate and two-way air intake structure as claimed in claim 1, wherein said fundamental base of said air filter has its upper edge bored with an annular groove for the lower edge of said annular filtering member to be positioned therein, said annular groove filled in with adhesives to bond said fundamental base with said annular filtering member together, said fundamental base having its central portion extending downward and forming a tubular member having an axial vent hole in the center.

4. The vertical-shaft air filtering device having high flow rate and two-way air intake structure as claimed in claim 1, wherein said fixed annular cover has its lower edge formed with an annular groove for fitting the upper edge of said annular filter member, and said strip-shaped filtering member has its circumferential edge formed with an annular projecting edge to be positioned at the inner wall of said annular groove, said annular groove filled in with adhesives to bond said fixed annular cover, said annular filtering member and strip-shaped filtering member all together.

5. The vertical-shaft air filtering device having high flow and two-way air intake structure as claimed in claim 1, wherein said auxiliary air intake of said fixed annular cover has its inner wall formed with a smooth arc-shaped surface, letting the upper side of said auxiliary air intake formed with a comparatively wide opening.

6. The vertical-shaft air filtering device having high flow rate and two-way air intake structure as claimed in claim 5, wherein said auxiliary air intake of said fixed annular cover has its inner wall provided with plural current-guiding vanes preset in number and spaced apart equidistantly, said current-guiding vanes arranged radially in the same direction, with a current-guiding passage formed between every two current-guiding vanes.

7. The vertical-shaft air filtering device having high flow rate and two-way air intake structure as claimed in claim 1, wherein a measuring device, such as a pressure sensor or a flow meter, is assembled on said air intake of said air intake guiding base or on said vent hole under said air filter.

* * * * *